United States Patent [19]

Akita et al.

[11] 4,451,774
[45] May 29, 1984

[54] VEHICLE MOUNTED VOLTAGE REGULATOR

[75] Inventors: Yoshio Akita, Chiryu; Takanori Teshima, Kariya; Toshinori Maruyama, Iwakura; Koshi Torii, Kariya, all of Japan

[73] Assignee: Nippondenso Co., Ltd., Kariya, Japan

[21] Appl. No.: 354,432

[22] Filed: Mar. 3, 1982

[30] Foreign Application Priority Data

Mar. 6, 1981 [JP] Japan .................................. 56-32860
Apr. 20, 1981 [JP] Japan .................................. 56-60479

[51] Int. Cl.$^3$ .............................................. H02J 7/24
[52] U.S. Cl. ....................................... 320/64; 320/48; 322/99
[58] Field of Search ............... 320/64, 39, 48; 322/28, 322/99

[56] References Cited

U.S. PATENT DOCUMENTS

| | | | |
|---|---|---|---|
| 3,866,106 | 2/1975 | Taguchi | 320/64 |
| 4,020,414 | 4/1977 | Paredes | 320/48 |
| 4,280,087 | 7/1981 | Kasiewicz | 320/64 |
| 4,315,205 | 2/1982 | Mori et al. | 320/48 |
| 4,316,134 | 2/1982 | Balan et al. | 320/64 |
| 4,413,222 | 11/1983 | Gansert et al. | 320/64 |

FOREIGN PATENT DOCUMENTS 47-38142 9/1972 Japan .
53-11643 4/1978 Japan .

Primary Examiner—William H. Beha, Jr.
Attorney, Agent, or Firm—Cushman, Darby & Cushman

[57] ABSTRACT

In a roadway vehicle having a storage battery and an engine-driven alternator, the battery voltage is controlled by a voltage regulator which has a first voltage detector for detecting when the battery voltage reduces below a higher reference level at which the battery voltage is normally controlled, and a second voltage detector for detecting when the battery voltage reduces below a lower reference level. A third voltage detector detects when the alternator voltage rises above a predetermined level. A logic gate circuit responds to outputs from the second and third voltage detectors by generating a warning signal. A semiconductor switching element is coupled in series with the field coil of the alternator to supply thereto the alternator voltage in response to a switching control which is generated in response to an output signal from the first voltage detector to cause the switching element to operate the alternator in a high output state and in response to the logic gate circuit to operate the alternator in a low output state.

11 Claims, 5 Drawing Figures

VEHICLE MOUNTED VOLTAGE REGULATOR

BACKGROUND OF THE INVENTION

The present invention relates to voltage regulators for vehicle-mounted batteries, and in particular to a vehicle-mounted voltage regulator capable of regulating the battery voltage at appropriate level under varying operating conditions including disconnection of a power line through which the battery is charged from the engine-driven alternator.

Vehicle-mounted voltage regulators as typically shown and described in Japanese Pat. Nos. 47-38142 and 53-11643 are of the double detection type in which the battery and alternator voltages are monitored by a common voltage sensor through a resistor-diode network. Shortcomings inherent in the known regulators reside in the fact that potential difference in the power line between the alternator and battery makes it difficult to provide voltage adjustment at the point of voltage detection since such potential difference is variable with mutual relations between the battery and alternator voltages. Furthermore, the known regulators are not provided with an indicator circuit which provides a warning signal indicating the occurrence of disconnection in the power line to the vehicle occupant.

SUMMARY OF THE INVENTION

An object of the invention is to provide an improved vehicle-mounted voltage regulator which is capable of issuing a warning signal when battery voltage has dropped considerably in the event of a disconnection in the power line.

Another object of the invention is to provide a voltage regulator which protects the alternator control switching element from overvoltage which would occur in the event of power line disconnection.

The stated objects are attained by a voltage regulator which comprises a first voltage detector for detecting when the voltage of the vehicle-mounted battery reduces below a higher reference level at which the battery voltage is normally controlled, and a second voltage detector for detecting when the battery voltage reduces below a lower reference level. A third voltage detector is provided for detecting when the voltage generated by the engine-driven alternator rises above a predetermined level. A logic gate circuit is provided to respond to outputs from the second and third voltage detectors by generating a warning signal. A semiconductor switching element is coupled to the field coil of the alternator to supply thereto the alternator voltage in response to a switching control signal supplied from a switching control means. The switching control signal is generated in response to an output signal from the first voltage detector to cause the switching element to operate the alternator in a high output state and in response to the logic gate circuit to operate the alternator in a low output state.

BRIEF DESCRIPTION OF THE DRAWINGS

The invention will be described in further detail with reference to the acccompanying drawings, in which:

FIG. 2 is a graph illustrating the relation between the time it takes for the battery to drop to a lower reference level as a function of load current;

FIG. 3 is a circuit diagram of the holding circuit of FIG. 1;

FIG. 4 is a circuit diagram of a modified form of the FIG. 1 embodiment; and

DETAILED DESCRIPTION

Figure 1:
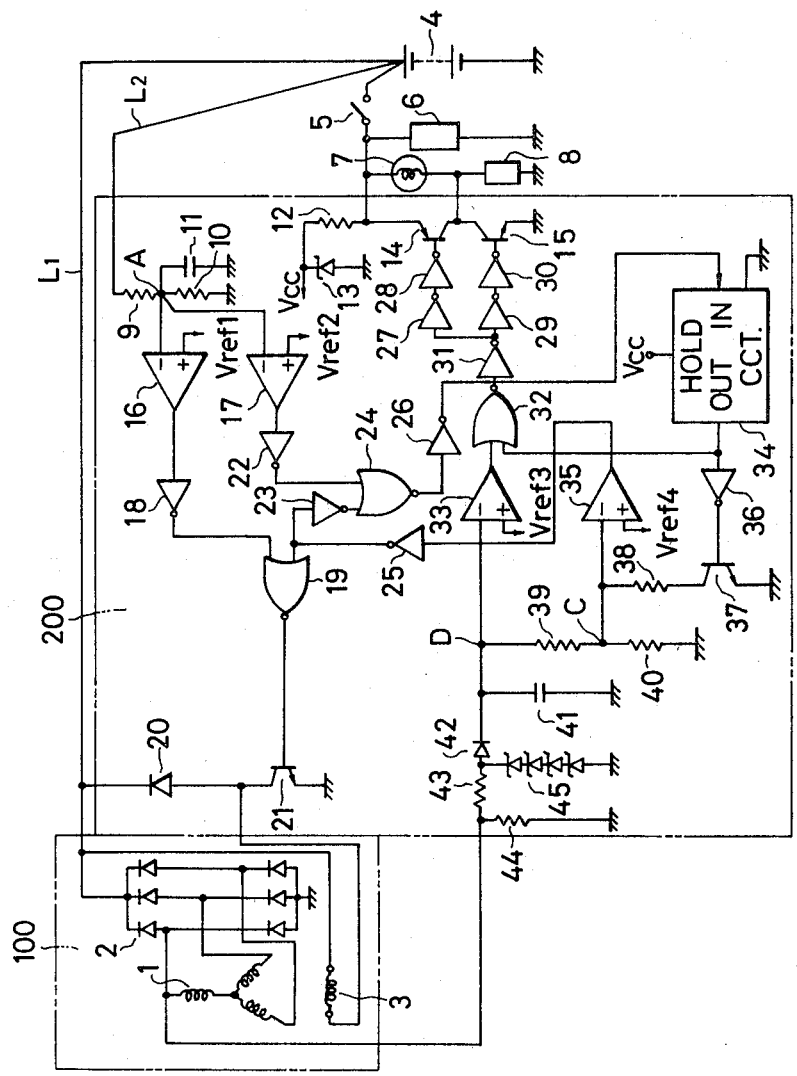
FIG. 1 is a circuit diagram of a first embodiment of the present invention.

In FIG. 1 there is shown a first preferred embodiment of the vehicle power supply system of the invention. The power supply circuit generally comprises an alternator 100 having its rotor shaft coupled by a pulley, not shown, to the output shaft of an internal combustion engine so that the rotor turns at a speed higher than the rotational speed of the engine output shaft. A voltage regulator 200 monitors the voltage generated by the alternator 100 and the DC voltage supplied from a storage battery 4 through a sensing line L2. The battery 4 has its positive terminal coupled via a charging line L1 to a full-wave rectifier generally shown at 2 which is coupled to the alternator 100 for AC-DC conversion. The alternator 100 comprises star-coupled three-phase stator coils 1 connected to the rectifier 2. The AC voltage generated by the alternator is controlled by magnetic field provided by a field coil 3 having its one end coupled to the positive terminal of the rectifier 2 and its other end coupled to ground through the collector-emitter path of a switching transistor 21 of the control circuit 200. The AC voltage of the alternator 100 which is monitored by the control circuit 200 is obtained from one of the stator coils 1. The positive terminal of the battery 4 is coupled to an ignition device 6 via an ignition key switch 5. The DC voltage supply for various parts of the voltage regulator 200 is coupled from the ignition switch 5. A warning light 7 is coupled in series with a block 8 which represents various DC-powered elements of the vehicle.

The voltage regulator 200 includes a diode 20 connected between the positive terminal of the rectifier 2 and the collector of the switching transistor 21 for the purpose of absorbing counter EMF developed in the field coil in response to the switching action of transistor 21. This transistor is biased conductive in response to a high level output from a NOR gate 19. NOR gate 19 receives one of its inputs from a high DC level comparator 16 via an inverter 18 and another input from an alternator voltage sensing comparator 35 via an inverter 25. The comparator 16 has its inverting input coupled to a voltage divider formed by resistors 9 and 10 which are coupled in series between the positive and negative terminals of the battery. Voltage developed at a junction A between resistors 9 and 10 is compared in comparator 16 with a higher DC reference level. A capacitor 11 is coupled to the junction A to stablize the voltage thereat.

The voltage from the ignition switch 5 is coupled through a resistor 12 to a Zener diode 13 which provides a constant DC voltage Vcc to various parts of the circuit 200 including a voltage divider, not shown, which provides reference voltages Vref1, Vref2, Vref3, Vref4 and Vref5. The reference voltage Vref1 corresponds to a higher DC reference level at which the battery voltage is to be normally maintained, and reference voltage Vref2 corresponds to a lower DC reference level. When the battery voltage drops below the lower DC reference Vref2, the vehicle occupant is alerted in a manner to be described later. The reference voltage Vref3 corresponds to a lower AC threshold.

When the alternator voltage is below the lower AC threshold, the vehicle occupant is also alerted that the alternator is not generating specified voltage. The reference voltage Vref4 represents a variable reference which assumes a higher or a medium AC refernce level at which the alternator voltage is selectively controlled.

For purposes of illustration, the reference voltage Vref1 corresponds to 14.5 volts at which the battery 4 is normally controlled. When the battery voltage is higher than 14.5 volts, comparator 16 provides a low level output which is inverted to a high level signal by inverter 18 and applied to the NOR gate 19 to bias the transistor 21 nonconductive so that the field coil 3 is de-energized. The voltage regulator 200 includes a rectifier circuit formed by a resistor 43 and a diode 42 connected in a series circuit connected from the stator coil 1 to the inverting input of a comparator 33. This rectifier further includes a grounded resistor 44, a group of series-connected diodes 45 connecting the anode of diode 42 to ground and a capacitor 42 which couples the cathode of diode 42 to ground. The rectified voltage is applied to a circuit junction D which is coupled to ground by a divider formed by resistors 39 and 40. The DC voltage divided by the resistors 39 and 40 appears at a junction C which is coupled to ground through a circuit including a resistor 38 and the collector-emitter path of a transistor 37. The comparator 35 has its inverting input coupled to the circuit junction C for making a comparison with reference voltage Vref4. Depending on the switching state of the transistor 37 the voltage at junction C is discretely varied. The reference voltage Vref4 is determined so that when transistor 37 is in conductive state the comparator 35 switches to a high level output state in response to the AC voltage falling below a higher AC reference level typically 22 volts and when transistor 37 is in nonconductive state the comparator 35 switches to a high level state in response to the AC voltage falling below a lower AC reference level typically 15.4 volts. The NOR gate 19 makes logical decision to bias the transistor 21 conductive when the battery voltage falls below 14.5 volts and at the same time the AC voltage also falls below the reference Vref4.

The comparator 33 compares the alternator voltage at junction D with reference Vref3 which is typically 8 volts. The output of comparator 33 is coupled to an input of a NOR gate 32 which has its output coupled through inverters 31, 29 and 30 to the base of a transistor 15 and further coupled through inverters 27 and 28 to the base of a transistor 14. The DC voltage from ignition switch 5 is coupled through the emitter-collector path of transistor 14 and the collector-emitter path of transistor 15 to ground, the junction between transistors 14 and 15 being coupled to a junction between warning light 7 and load 8. Thus, when the voltage at junction D falls below Vref3 (=13 volts), the NOR gate 32 is switched to a low output state to turn on transistor 15 and turn off transistor 14, so that warning light 7 is lit to issue a warning signal indicating that the alternator voltage is lower than a predetermined setting.

The voltage at junction A is also coupled to the inverting input of a lower DC level comparator 17 for comparison with reference Vref2 which corresponds a voltage typically at 13 volts. When the battery voltage falls below 13 volts, the comparator 17 switches to a high output state which is inverted by an inverter 22 and coupled to an input of a NOR gate 24 to the other input of which is coupled the output of inverter 25 via inverter 23. It is seen that NOR gate 24 generates a high level output when the battery voltage falls below 13 volts and at the same time the AC voltage is higher than reference Vref4. The high level output of NOR gate 24 is inverted by an inverter 26 and applied to an input of a holding circuit 34. As will be fully described later, the holding circuit 34 exclusively responds to the transition of its input level from high to low voltage by producing a high voltage output which is maintained until the voltage Vcc is reduced substantially to zero when ignition switch 5 is turned off. The output of holding circuit 34 is coupled by an inverter 36 to the base of switching transistor 37 for switching the relative levels of the inputs to comparator 35 and is also coupled to another input of NOR gate 32 for switching the operating states of transistors 14 and 15.

The operation of the embodiment of FIG. 1 will now be described.

When the ignition switch 5 is closed for starting the engine, a constant DC voltage is supplied to various elements of the voltage regulator 200. The battery voltage may be slightly lower than 14.5 volts during startup periods while the AC voltage is zero since the field coil 3 is not yet energized. Comparators 16 and 35 thus provide high voltage outputs which are inverted respectively by inverters 18 and 25; NOR gate 19 is switched to a high output state which turns on transistor 21 energizing the field coil 3. Concurrently, comparator 33 is in a high output state causing the NOR gate 32 to switch to a low output state since the voltage at junction D is low, so that transistor 14 is turned off and a transistor 15 turned on to light up the warning light 7. If trouble has occurred in the alternator, the indication will continue to alert the vehicle occupant.

If the alternator is working properly, the AC voltage rises rapidly so that DC voltage at junction D exceeds reference Vref3 (=8 volts) and comparator 33 switches to a low output state. Voltage at junction C is still lower than reference Vref4 and hence the output of comparator 35 remains high to continue energization of field coil 3 so long as the signal from inverter 18 to NOR gate 19 is at low voltage level. This high voltage from comparator 35 is also passed through inverters 25 and 23 and applied as a high level input to NOR gate 24 to cause it to generate a low level output regardless of the condition of its another input from comparator 17. The low level output of NOR gate 24 is inverted at 26 to high level and applied to the holding circuit 34. Since the latter circuit is exclusively responsive to the negative transition of its input signal to generate a high output voltage as described previously, a low voltage condition is still present at the inputs of inverter 36 and NOR gate 32. Therefore, NOR gate 32 now switches to a high output state in response to the comparator 33 being switched to the low output state and turns on transistor 14 and turns off transistor 15, causing warning light 7 to extinguish and allowing current to flow in the load 8.

Meanwhile, the battery 4 is charged with a DC voltage supplied over line L1 from the alternator. When the battery voltage exceeds 14.5 volts, the comparator 16 now switches to low output state which is inverted at 18 and applied as a high voltage input to NOR gate 19. Thus, the output of NOR gate 19 switches to a low level to turn off the switching transistor 21 to de-energize the alternator. As a result, the alternator voltage decreases and the battery voltage decreases below the 14.5-volt level again and the alternator 100 is reenergized to repeat the above processes so that the battery voltage is maintained at the reference voltage Vref1 established by resistors 9 and 10.

If disconnection occurs in the DC power supply line L1 when the system is operating in a manner as described above, the battery voltage will drop below 14.5 volts and a high level voltage will appear at the output of comparator 16 placing a low level input to NOR gate 19. For a certain period immediately after the disconnection occurs the battery voltage is higher than 13 volts. Thus, comparator 17 remains in a low output state presenting a high level input to NOR gate 24 and the input to the holding circuit 34 remains at high voltage level so that the output of holding circuit 34 is at low voltage level and transistor 37 is still in a conductive state. Therefore, the variable reference voltage Vref4 still corresponds to 22 volts. Since during such periods the alternator voltage is close to 14.5 volts, comparator 35 is in a high output state presenting a low level input to NOR gate 19. As a result, NOR gate 19 generates a high level output causing transistor 21 to turn on. The alternator 100 is energized to increase its output voltage until it reaches 22 volts whereupon comparator 35 switches to a low output state to turn off transistor 21. The turn-off of transistor 21 will eventually cause the alternator voltage to decrease below 22 volts which is sensed by comparator 35 to turn on transistor 21 again. This process will be repeated to maintain the alternator voltage at 22 volts until transistor 37 switches from high to low output state. Since voltage at junction D is higher than 8 volts, comparator 33 provides a low level output to NOR gate 32. Since the holding circuit 34 is still in low output state, NOR gate 32 is in a high output state so that warning light 7 remains off.

Figures 2, 3, 4:
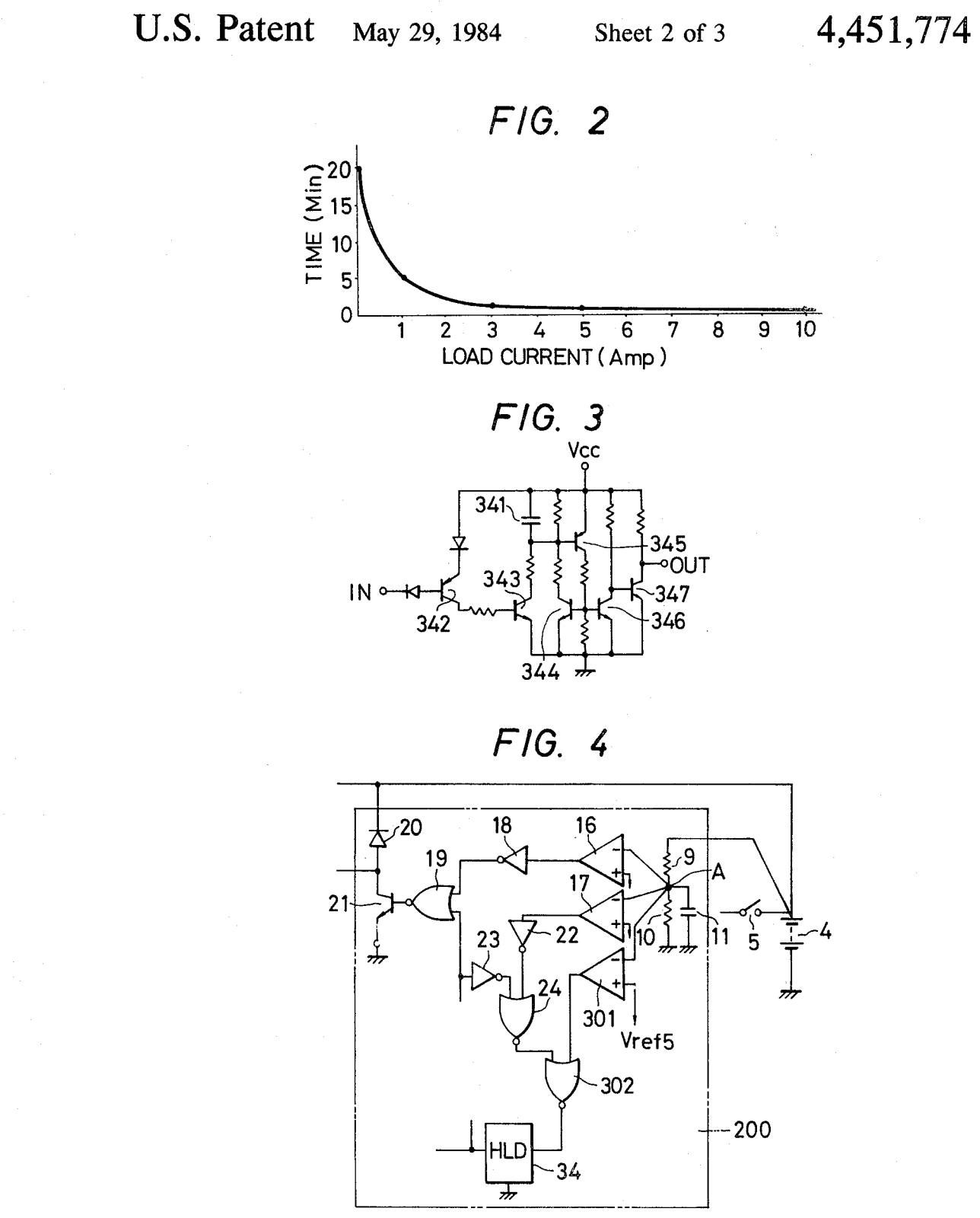

If the disconnection of line L1 should continue, the battery energy will be consumed so that the voltage at junction A will eventually drop below 13 volts and comparator 17 now switches to a high output state placing a low level input to NOR gate 24. Since comparator 35 intermittently generates a low level output by the process indicated above and this low-level output is passed through inverters 25 and 23 and applied as a low level input to NOR gate 24, the latter switches to a high output state in response to the first occurrence of the low-level output of comparator 35 after comparator 17 switches to the high output state. The low-level output of NOR gate 24 is passed through inverter 26 to the holding circuit 34, presenting to it an input transition of high to low level. Holding circuit 34 now switches to a high output state to switch NOR gate 32 to a low output state to turn on warning light 7 to alert the vehicle occupant indicating that the battery charging circuit L1 has been disconnected and the battery voltage is on the decrease below the lower setting level. At the same time, transistor 37 is turned off to switch the threshold level of the comparator 35 from 22 volts to 15.4 volts so that the alternator voltage is controlled at the 15.4-volt level. This serves to prevents the switching transistor 21 from being excessively heated to the point of breakdown. Therefore, the alternator is operated to generate a 22-volt output for an interval from the instant when the line L1 is disconnected to the instant when the battery voltage drops below 13 volts which is detected by comparator 17. Since the battery voltage decreases as a function of load current and the interval as noted above is an inverse function of the load current, the battery takes a maximum of 20 minutes to reduce its voltage from Vref1 to Vref2 as illustrated in FIG. 2. The amount of this interval is reasonable for selecting the power rating for transistor 21 and its associated circuit elements to operate with a sufficient amount of safety margin.

FIG. 3 is an illustration of the detail of holding circuit 34. The circuit 34 comprises a transistor 342 having its base coupled to an input terminal IN to which the output of inverter 26 is connected. Transistor 342 has its emitter coupled to a voltage supply terminal at potential Vcc which is coupled to the cathode of Zener diode 13 and its collector coupled to the base of a transistor 343 having its collector-emitter path coupled in series with a capacitor 341 between terminal Vcc and ground. Capacitor 341 serves to bias a transistor 345 nonconductive when voltage Vcc is applied to drive the output terminal OUT to a predetermined initial level. When the voltage level at input terminal IN is high, transistors 342, 343, 345, 346 are turned off and transistor 347 is turned on to place a low voltage to the output terminal OUT. In response to a low voltage input to terminal IN transistors 342, 343, 344, 345, 346 are turned on to turn off transistor 347 switching the output terminal OUT to a high voltage level. Transistors 343 to 346 keep the on state until the voltage Vcc is removed so that the high level output is maintained until the turn-off of ignition switch 5.

FIG. 4 is an illustration of a modified embodiment of the invention in which the same numerals are used to indicate those corresponding to FIG. 1 and only a relevant part thereof is illustrated for simplicity. The modified vehicle power supply circuit includes an additional comparator 301 which compares the DC voltage at junction A with reference voltage Vref5 to generate a high voltage output when the DC voltage drops below Vref5. A NOR gate 302 is included in place of the inverter 26 of FIG. 1 to receive outputs from NOR gate 24 and comparator 301, the output of NOR gate 302 being coupled to the input of holding circuit 34. The operation of the circuit of FIG. 4 is as follows. With the charging circuit L1 coupling the alternator to the battery 4, the occurrence of disconnection in the voltage sensing circuit L2 will cause the voltage at junction A to reduce to a level substantially equal to the ground potential and as a result the comparator 301 produces a high level output. NOR gate 302 then switches to a low output state causing the holding circuit 34 to be triggered into a high output state. As a result, the alternator voltage is controlled to 15.4 volts and at the same time warning light 7 is energized to indicate the abnormality of the power circuit. Since the alternator voltage is maintained at 15.4 volts, the battery is kept from being overcharged.

Figure 5:
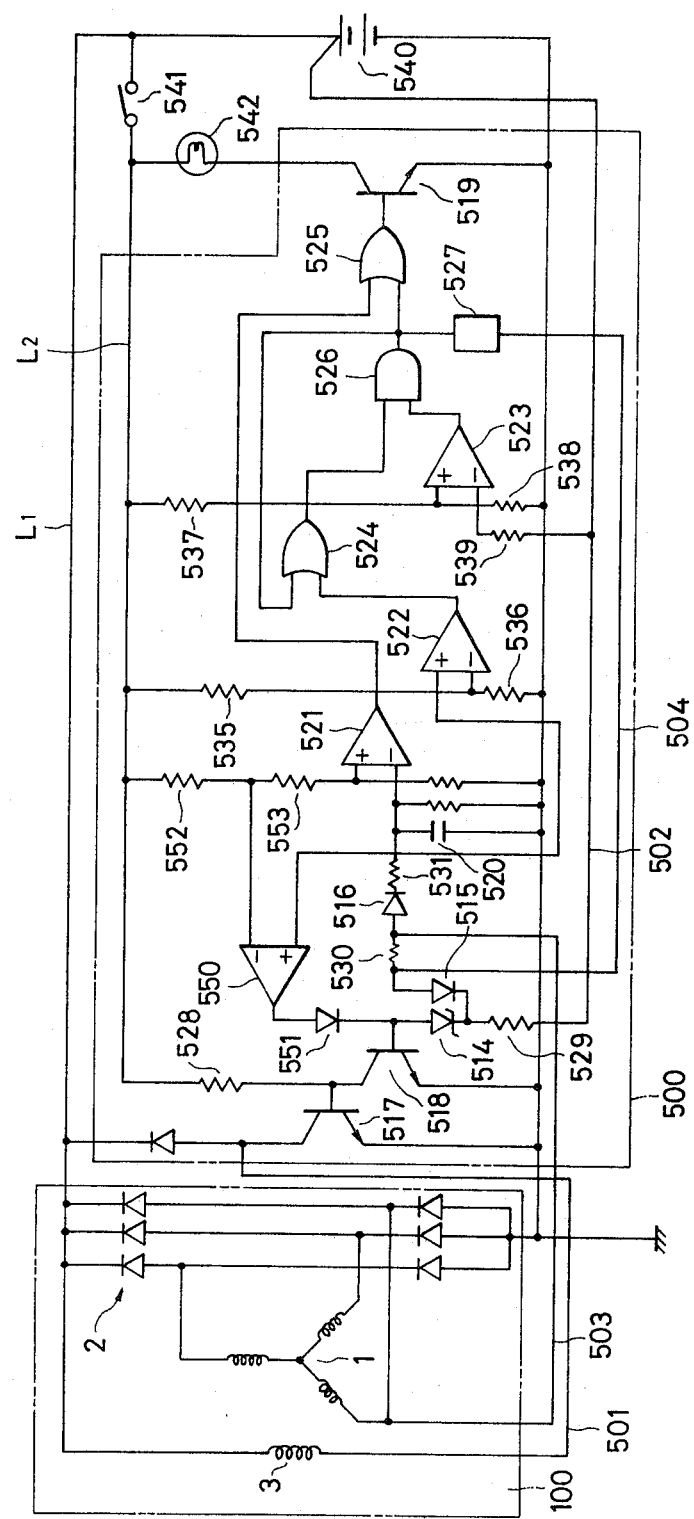
FIG. 5 is a circuit diagram of a second embodiment of the present invention.

FIG. 5 is an illustration of a second embodiment of the present invention in which parts corresponding to those in FIG. 1 are identified by like reference numerals and in which the voltage regulator is designated 500.

The voltage regulator 500 comprises a switching transistor 517 through the collector-emitter path of which the field coil 3 is coupled to ground. The base of transistor 517, which is biased with a DC voltage supplied through resistor 528, line L2 and through ignition switch 541 from the positive terminal of battery 540, is coupled to ground through a short-circuit path provided by the collector-emitter path of a switching transistor 518 when the latter is rendered conductive through a reference setting circuit formed by a Zener diode 514 and a resistor 529 which are coupled in series through line 502 to the positive terminal of battery 540. Specifically, the Zener diode 514 has a breakdown voltage of 14.5 volts. When the battery voltage is lower than 14.5 volts the Zener diode and consequently transistor 518 is nonconductive and transistor 517 is conductive to allow passage of current to the field coil 3. When the battery voltage is higher than 14.5 volts, Zener diode and transistor 518 are turned on and transistor 517 is turned off. By repeating the above process the alternator is controlled to charge the battery to keep its voltage at 14.5 volts.

One of the stator coils 1 is coupled through a line 503, a diode 516 and resistor 531 to the inverting input of a low AC level comparator 521. Capacitor 520 and resistor 533 form a smoothing circuit for converting the voltage rectified by diode 516 into a DC voltage for making comparison with a reference level (8 volts) established by resistors 534, 553 and 552 at a junction between resistors 552 and 553. The output of comparator 521 is coupled through an OR gate 525 to the base of a transistor 519 through the collector-emitter path of which warning light 542 is coupled from line L2 to ground. When the alternator voltage is very low, comparator 521 provides a high level output to transistor 519 to turn on lamp 542 to indicate that the alternator voltage is lower than specified level.

The DC voltage coupled to the inverting input of comparator 521 is also applied to the noninverting input of a second comparator 522 which compares it with a reference level established by resistors 535 and 536 which corresponds to an AC voltage (20 volts, for example) which would be generated when line L1 is disconnected during system operation. Comparator 522 switches to a high output state when the alternator voltage rises above that reference level and feeds its output through an OR gate 524 to one input of an AND gate 526. A third comparator 523 has its inverting input coupled by a resistor 539 to the positive terminal of battery 540 and its noninverting input coupled to a reference voltage (13 volts) set up by resistors 537 and 538. Third comparator 523 serves to detect when the battery voltage falls below 13 volts by generating a high level output to another input of AND gate 526. Upon coincidence of outputs from the second and third comparators 522, 523, AND gate 526 issues a high level output to a switch 527. When the output of AND gate 526 is low, switch 527 applies a low voltage through a line 504 to the anode of diode 515 so that the application of AC voltage through line 503 to the base of transistor 518 is normally inhibited, while allowing the application of DC voltage through line 502 thereto, so that transistor 517 is normally responsive to the battery voltage. In response to the high level output from AND gate 526 the switch 527 is opened so that diode 515 allows application of the AC voltage to the base of transistor 518. The output of AND gate 526 is further coupled to OR gate 524 to form a self-holding circuit with which it maintains a high level output once activated by comparators 522 and 523. The switch 527 may be formed of an open-collector type transistor having its base coupled to the output of AND gate 526 and its emitter-collector path connected from ground to the anode of diode 515.

The voltage regulator 500 further includes a fourth comparator 550 having its noninverting input coupled to the inverting input of the first comparator 521 and its inverting input coupled to a junction between resistors 552 and 553. The voltage at this junction corresponds to an AC voltage which would occur when line L1 is disconnected in a manner to be described hereinbelow. The output of the fourth comparator 550 is coupled by a diode 551 to the base of transistor 518.

When disconnection occurs in the line L1, the battery voltage will eventually decrease to a low level but higher than the threshold value of transistor 517, so that the latter remains conductive to supply field current to the alternator. Therefore, the alternator voltage tends to increase while the battery voltage decreases. When the DC voltage through diode 516 becomes higher than 20 volts with respect to ground and the battery voltage becomes lower than 13 volts, comparators 522 and 523 switch to high output state presenting a high level output from AND gate 526 to switch 527 to allow application of AC voltage on line 503 to the base of transistor 518 to increase its base potential. Thus, transistor 518 is turned on and transistor 517 turned off when the AC voltage exceeds the breakdown voltage of Zener diode 514 to regulate the AC voltage at an appropriate value. The high level output of AND gate 526 is passed to transistor 519 to turn on the warning lamp 542 to alert the vehicle occupant of the emergency.

When disconnection occurs in the line 502 the alternator voltage rises above the reference of comparator 550 so that it provides a high voltage output via diode 551 to the base of transistor 518 to turn off transistor 517 to shut off the field current. This keeps the alternator voltage from increasing to an abnormally high level which would burn out transistor 517.

What is claimed is:

1. A voltage regulator for a storage battery coupled to an alternator through a recitifer, said alternator being driven by an engine mounted on a vehicle, comprising:
   first detecting means for detecting when the voltage of said battery reduces below a higher reference level;
   second detecting means for detecting when the voltage of said battery reduces below a lower reference level;
   third detecting means for detecting when the voltage generated by said alternator rises above a predetermined level, said third detecting means comprising comparator means for comparing the alternator voltage with a variable reference level which is variable in response to the absence and presence of said warning signal and generating a comparator output when said alternator voltage is lower than said variable reference level;
   logic gate means for generating a warning signal in response to outputs from said second and third detecting means;
   a semiconductor switching element for supplying said alternator voltage to a field coil of said alternator; and
   switching control means for controlling said switching element in response to said first detecting means and to said comparator output to cause said switching element to operate said alternator in a high output state and controlling said switching element in response to said logic gate means to operate said alternator in a low output state.

2. A voltage regulator as claimed in claim 1, wherein said logic gate means further comprises holding circuit means for maintaining said warning signal.

3. A voltage regulator as claimed in claim 1 or 2, wherein said switching control means comprises coincidence gate means for supplying a coincidence output to said switching element in response to there being simultaneous presence of said comparator output and an output from said first detecting means.

4. A voltage regulator as claimed in claim 1 or 2, wherein said semiconductor switching element and switching control means comprise a first and a second transistor each having a switched conductive path and a control electrode, the conductive path of the first transistor being coupled in series with said field coil, the conductive path of said second transistor being coupled to the control electrode of said first transistor to provide a variable potential thereto, a breakdown diode coupled between the control electrode of said second transistor and said battery, and a second diode coupling the output of said gate means to said breakdown diode and coupling said alternator voltage through a resitor to said breakdown diode.

5. A voltage regulator for a storage battery charged by an engine-driven alternator having a field coil, comprising:
   first comparator means (16) for comparing the voltage of said battery with a higher threshold level to generate a first comparator output when the battery voltage reduces below said higher threshold level;
   second comparator means (17) for comparing the battery voltage with a lower threshold level to generate a second comparator output when the battery voltage reduces below the lower threshold level;
   third comparator means (35) for comparing the output voltage of said alternator with a reference voltage to generate a third comparator output when the alternator output voltage rises above said reference voltage;
   logic gate means (22-38) for detecting a simultaneous presence of said second and third comparator outputs and causing said alternator output voltage and said reference voltage to vary with respect to each other so that the reference voltage decreases relative to said alternator output voltage;
   alternator control means (18, 19, 21) responsive to said first and second comparator outputs to energize said field coil and responsive to said third comparator output to de-energize said field coil to keep said alternator output voltage at a level corresponding to said reference voltage; and
   means (14, 15, 7) for generating a warning in response to the detection of said simultaneous presence of said second and third comparator outputs by said logic gate means.

6. A voltage regulator as claimed in claim 5, wherein the output of said alternator (1) is connected through a rectifier (2) by a first power line ($L_1$) to said storage battery (4), said first and second comparator means including a voltage divider (9, 10) having one end connected to ground and the other end connected to said storage battery by a second power line ($L_2$), said voltage divider being connected as a common input to said first and second comparator means (16, 17) for comparison with said higher and lower threshold levels.

7. A voltage regulator as claimed in claim 5, wherein said logic gate means comprises:
   a coincidence gate (24) for detecting a match and mismatch between said second and third comparator outputs;
   means (34) responsive to the detection of a match by said coincidence gate for providing a binary signal representative of the match until the detection of a noncoincidence by said coincidence gate; and
   switching means (37) responsive to said binary signal to vary said alternator output voltage and said reference voltage relative to each other.

8. A voltage regulator as claimed in claim 5, wherein said alternator control means comprises a coincidence gate (19) for detecting a match between said first and third comparator outputs and a switching device (21) for connecting the output of said alternator (1) through a rectifier (2) to said field coil (3) in response to the detection of a match by said coincidence gate.

9. A voltage regulator for a storage battery charged by an engine-driven alternator having output windings and a field winding:
   first means (16) for comparing the voltage of said battery with a first reference voltage and generating therefrom a first signal;
   second means (17) for comparing the voltage of said battery with a second reference voltage lower than said first reference voltage and generating therefrom a second signal;
   third means (33) for comparing the output voltage of said alternator with a third reference voltage lower than said first reference voltage and generating therefrom a third signal;
   fourth means (35) for comparing a divided voltage of said alternator output voltage and generating therefrom a fourth signal;
   means (22, 24, 26, 34, 36, 37) for changing the level of said divided voltage in response to said second signal;
   a semiconductor switching element for supplying electric current to said field winding;
   means (18, 19, 25) for controlling said semiconductor switching element in response to said first and fourth signals; and
   logic gate means for generating a warning signal in response to said second and third signals.

10. A voltage regulator as claimed in claim 9, further comprising means for detecting when disconnection occurs in a connection from said battery to said first and second comparing means and generating therefrom a disconnection occurrence signal and applying the disconnection occurrence signal to said changing means.

11. A voltage regulator as claimed in claim 10, wherein said disconnection detecting means comprises voltage dividing resistors (9, 10) connected in series from one terminal of said storage battery to ground, a comparator for comparing a voltage developed at a junction between said resistors with a fifth reference voltage and generating therefrom a comparator output when said developed voltage reduces below said fifth reference voltage and applying said comparator output to said changing means.

* * * * *